(12) United States Patent
Sowry et al.

(10) Patent No.: US 7,018,134 B2
(45) Date of Patent: Mar. 28, 2006

(54) FOUNDATION AND SOIL IRRIGATION SYSTEM UTILIZING WICKING MATERIALS

(75) Inventors: Alan D. Sowry, Plano, TX (US);
Donald J. Turnage, Plano, TX (US);
Omar Besim Hakim, Austin, TX (US)

(73) Assignee: Aquadation Licensing, LLC, Plano, TX (US)

( * ) Notice: Subject to any disclaimer, the term of this patent is extended or adjusted under 35 U.S.C. 154(b) by 0 days.

(21) Appl. No.: 10/374,223

(22) Filed: Feb. 25, 2003

(65) Prior Publication Data

US 2003/0133753 A1    Jul. 17, 2003

Related U.S. Application Data

(63) Continuation of application No. 09/887,382, filed on Jun. 22, 2001, now Pat. No. 6,558,078.

(60) Provisional application No. 60/223,019, filed on Aug. 4, 2000.

(51) Int. Cl.
*A01G 25/06*    (2006.01)

(52) U.S. Cl. .............................. 405/37; 405/43; 405/44; 405/45

(58) Field of Classification Search .................. 405/37, 405/36, 43, 44, 45, 47, 51
See application file for complete search history.

(56) References Cited

U.S. PATENT DOCUMENTS

| | | | |
|---|---|---|---|
| 3,747,399 A * | 7/1973 | Treirat ......................... | 405/37 |
| 3,797,738 A * | 3/1974 | Fitzhugh ........................ | 239/1 |
| 4,194,691 A | 3/1980 | Birnbach et al. ............. | 239/63 |
| 4,534,143 A | 8/1985 | Goines et al. ............. | 52/169.5 |
| 4,620,398 A | 11/1986 | Wallin ........................ | 52/169.1 |
| 4,684,920 A | 8/1987 | Reiter ......................... | 239/63 |
| 4,878,781 A | 11/1989 | Gregory et al. ............... | 405/52 |
| 4,879,852 A | 11/1989 | Tripp ......................... | 405/229 |
| 4,930,934 A * | 6/1990 | Adkins ......................... | 405/37 |
| 5,156,494 A | 10/1992 | Owens et al. ............... | 405/229 |
| 6,082,932 A | 7/2000 | Anderson ................... | 405/229 |
| 6,558,078 B1 * | 5/2003 | Sowry et al. .................. | 405/37 |

FOREIGN PATENT DOCUMENTS

| | | |
|---|---|---|
| JP | 11336009 | 12/1999 |
| JP | 11351728 | 12/1999 |

* cited by examiner

*Primary Examiner*—Frederick L. Lagman
(74) *Attorney, Agent, or Firm*—Choate, Hall & Stewart LLP

(57) ABSTRACT

The present invention provides a method and apparatus for a foundation and soil irrigation system having multiple independent zones that can be controlled to deliver fluid to surrounding soil. The system can be installed above or below ground, but in a preferred embodiment the system is subterranean and is installed 18 to 24 inches off of the foundation and 12 to 18 inches below ground level. Each independent zone comprises a fluid distribution network that forms a center-fed or end-fed section to ensure proper hydraulic flow throughout the zone. The system further utilizes a wicking material network installed below ground to irrigate a soil region.

19 Claims, 4 Drawing Sheets

FOUNDATION AND SOIL IRRIGATION SYSTEM UTILIZING WICKING MATERIALS

CROSS-REFERENCE TO RELATED APPLICATIONS

The present application is a continuation of, and claims priority to, U.S. patent application Ser. No. 09/887,382, filed on Jun. 22, 2001, now U.S. Pat. No. 6,558,078, the teachings of which are incorporated herein by reference.

FIELD OF THE INVENTION

The present invention relates to the field of foundation and soil irrigation and more specifically to a irrigation system having multiple independent zones for optimizing the moisture saturation of soil around the foundation of a structure.

BACKGROUND OF THE INVENTION

The expansion and contraction of soil is a significant factor in causing damage to the foundations of buildings and other structures. Such expansion and contraction results from changes in the moisture content of the soil and is particularly evident in clay soil. The changes in volume of the soil can place undesirable forces upon a foundation so as to cause structural damage.

Moisture content of soil can change for a variety of reasons. For example, water can be removed from the soil by the processes of transpiration via the presence of vegetation, evaporation and gravity. Such processes can create areas of localized water depletion as well as larger area wet/dry cycles that can cause a foundation to sag, crack and move, eventually leading to structural failure.

Attempts have been made in the prior art to stabilize the moisture content of soil around foundations:

U.S. Pat. No. 4,534,143 to Goines et al. discloses a soil moisture stabilization system comprising two circumferential zones around a house, where one circumferential zone is placed approximately three feet below the other.

U.S. Pat. No. 4,878,781 to Gregory et al. discloses a moisture control system comprising a plurality of supply pipes, accumulator pipes, and porous pipes for supplying water, storing water and allowing water to seep into surrounding soil.

U.S. Pat. No. 5,156,494 to Owens et al. discloses a soil moisture stabilization system that operates based on stress sensors placed on the foundation. Water is injected into the soil around a foundation when the stress sensors detect abnormal amounts of stress.

Despite these efforts, there remains a need for the development of an effective foundation and soil irrigation system. There is a particular need for a system that can optimize soil saturation and control specific sections around a structure that may need differing levels of moisture to achieve saturation.

SUMMARY OF THE INVENTION

The present invention provides a method and apparatus for a foundation and soil irrigation system having multiple independent zones that can be controlled to deliver water or other fluid through a fluid distribution network to surrounding soil (hereinafter, water will be generically used to represent any type of fluid suitable for transportation and distribution to soil). The system can be installed above or below ground, but in a preferred embodiment the system is subterranean and is installed 18 to 24 inches off of the foundation and 12 to 18 inches below ground level. Each independent zone comprises a network of sections that are connected together in predetermined increments to ensure proper hydraulic flow throughout the zone.

Optimum moisture saturation is achieved through the control of moisture content and user intervention. A controller enables each zone to water independently of the others. When a zone is selected to be turned "on", the controller is set to deliver water to the zone. Water is then distributed to the surrounding soil until the zone is turned "off" and water ceases to flow within the zone. Hydraulics and flow are balanced to achieve accurate saturation.

It is therefore one aspect of the invention to provide a foundation irrigation system comprising at least two independent zones, wherein each zone comprises a water distribution network that forms at least one center-fed or end-fed section of predetermined length. Such a predetermined length could optimally be in the range of 5 to 20 feet. A controller governs the flow of water to the independent zones. The water distribution network comprises a water transportation system and a soil moisturization system.

It is another aspect of the invention to provide a method of foundation irrigation comprising installing at least two independent zones around a foundation, feeding at least one section in each of the independent zones, and controlling the flow of water to said zones so as to allow each zone to water independently of other zones. Feeding the independent zones can be done by center-feeding, feeding at one-end, both ends, or any combination thereof. Optimal moisture saturation can be achieved through the manual monitoring of moisture content and user intervention.

BRIEF DESCRIPTION OF THE DRAWING

The invention is described with reference to the several figures of the drawing, in which.

DETAILED DESCRIPTION OF A PREFERRED EMBODIMENT

Figure 1:
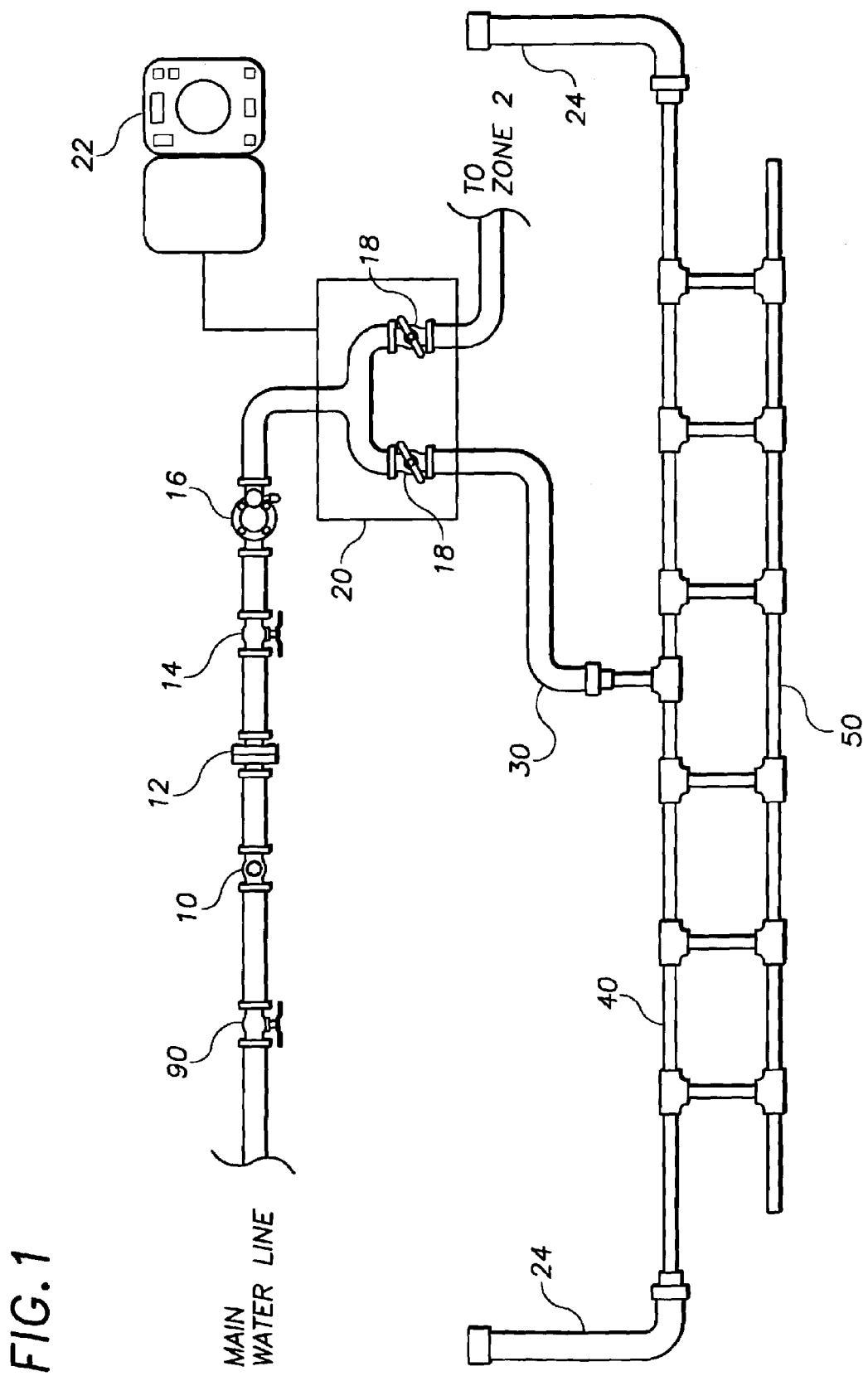
FIG. 1 is a schematic view of one embodiment of the invention showing a possible zone configuration.

Referring now to the figures of the drawing. FIG. 1 is a schematic view of one embodiment of the invention showing a possible zone configuration. Each independent zone comprises a network of both polyethylene 40 and porous piping 50 that are tee-connected together in predetermined increments. The system is connected to the main water line via valve 90. A backflow prevention device 10 is installed if one is not already present from an existing irrigation system and then connected to a master valve 14. A strainer 12, such as a wye strainer, can also be installed on the main water line between the backflow device 10 and the master valve 14 to help keep foreign matter out of the section piping in the event of a break. The master valve 14 is installed with a pressure regulator 16 in order to regulate pressure to the zone valves 18. The zone valves 18 are installed in a manifold 20, which can be installed in a centrally located valve box. A controller 22 governs the flow of water to each of the zones via the zone valves 18, enabling each zone to water independently of the others. The controller 22 can be an active monitoring controller that is electronic or hydraulic. It can utilize a water or moisture sensor placed within the soil (as described below) or a timer which operates in any desired time increment (as determined by the specifications of the type of controller used, for example 1 minute to 5.9 hours) with multiple start and finish times available for each zone. Alternatively, controller 22 can be a passive controller which utilizes a floating cut-off or other passive flow control switching mechanism.

The water seeps through the porous pipe 50 and moistens the surrounding soil until the zone is turned "off" and water ceases to flow within the zone. Hydraulics and flow are balanced to achieve accurate saturation. A rain sensor can also be connected to the controller 22 to ensure that the system is not turned "on" when it is raining. Risers 24 with threaded caps can be installed below ground to allow for visual observation of the zone for proper flow and trouble shooting.

Each zone is center-fed with solid PVC pipe 30 such as class 200 PVC pipe. The solid PVC pipe 30 center-feeds the polyethylene pipe 40 which, in turn, center-feeds porous pipe 50 sections of predetermined length, for example 10 feet. Center-feeding the porous pipe 50 in 10 foot increments helps to ensure proper hydraulic flow throughout the zone; however, in order to maintain proper flow, it has been found that a zone should generally not exceed 80 feet in linear run. Alternatively, each zone can be fed from one end, both ends or any combination of center-feeding and end-feeding.

The following brand-types and specifications for various components of the invention are included for exemplary purposes only:

| | |
|---|---|
| PVC Pipe | ¾" class 200 - Rated for 200 psi |
| | 1" class 200 - Rated for 200 psi (used to tie in main line) |
| PVC Fittings | Schedule 40 |
| Poly Tubing | ⅜" |
| Nylon Zip-ties | ⅛" × 6" used to secure porous tubing to nylon fittings |
| Porous Tubing | ⅜" |
| Nylon barbed fittings | ⅜" |

The backflow prevention device used was from Febco® and includes a double-check assembly, pressure vacuum breaker, and atmospheric vacuum breaker. The device can be installed as needed or tied in from an existing irrigation system.

The electronic controller used was the Rain Dial® Series from Irritrol® Systems.

The valves used were the 700 series UltraFlow from Irritrol® Systems.

The pressure regulator used was OmniReg™ from Irritrol® systems.

Figure 2:
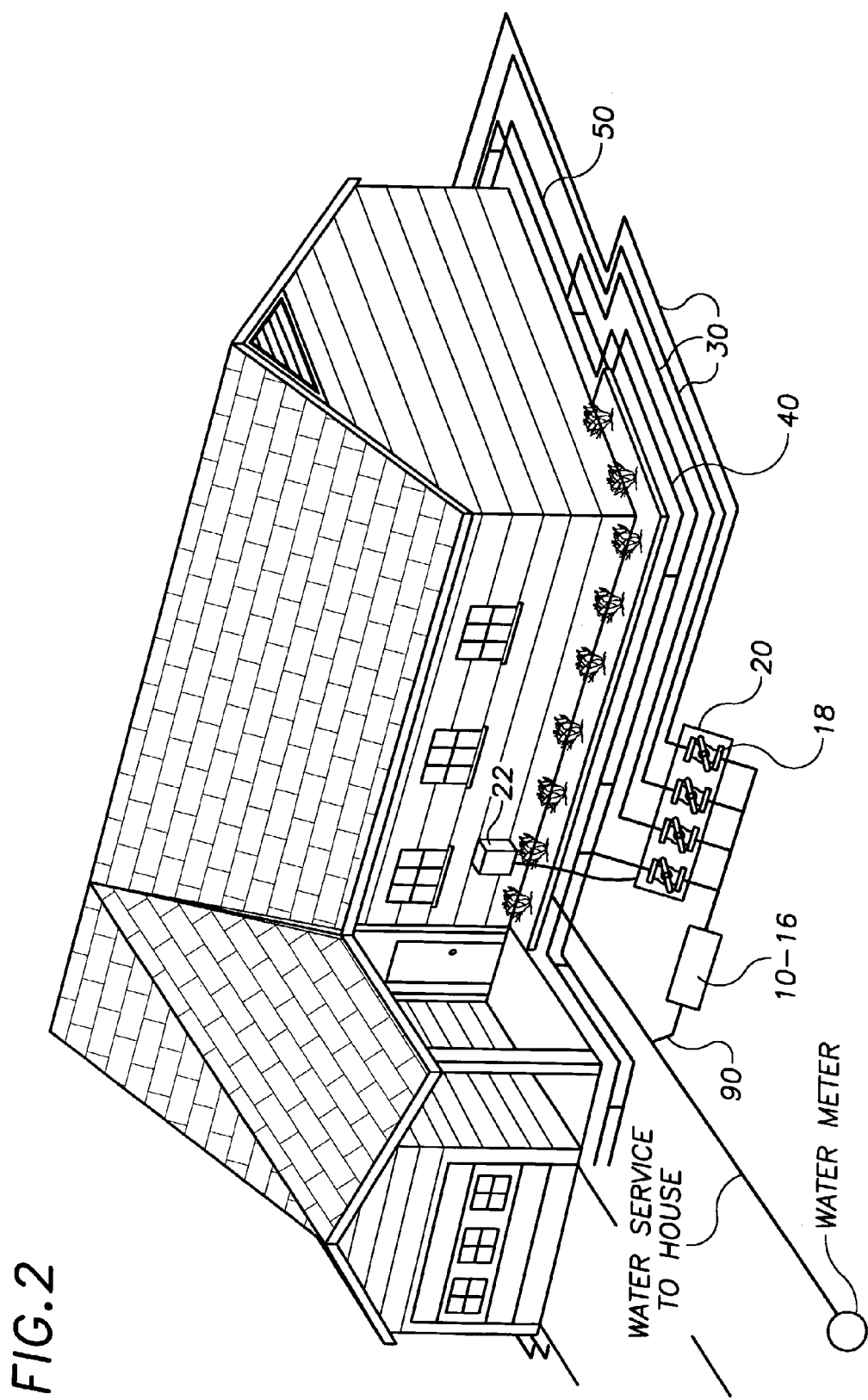
FIG. 2 is an isometric view showing four independent zones around a building structure.

FIG. 2 is an isometric view of the invention showing four independent zones around a building structure where each zone includes multiple center-fed sections. In the example shown, one independent zone is used for each side of the structure (front, back and sides). The system can be installed above or below ground, but in a preferred embodiment the system is subterranean and installed 18 to 24 inches off of the foundation and 12 to 18 inches below ground level. The system is tied into the main water line in the manner and with the components 90 and 10–16 described above. The controller 22 controls the flow of water to the independent zones via the zone valves 18 installed in manifold 20. The solid PVC pipe 30 center-feeds the polyethylene pipe 40 which, in turn, center-feeds porous pipe 50 sections of predetermined length. Optimum moisture saturation is achieved through manually monitoring moisture content and user intervention.

Figure 3:
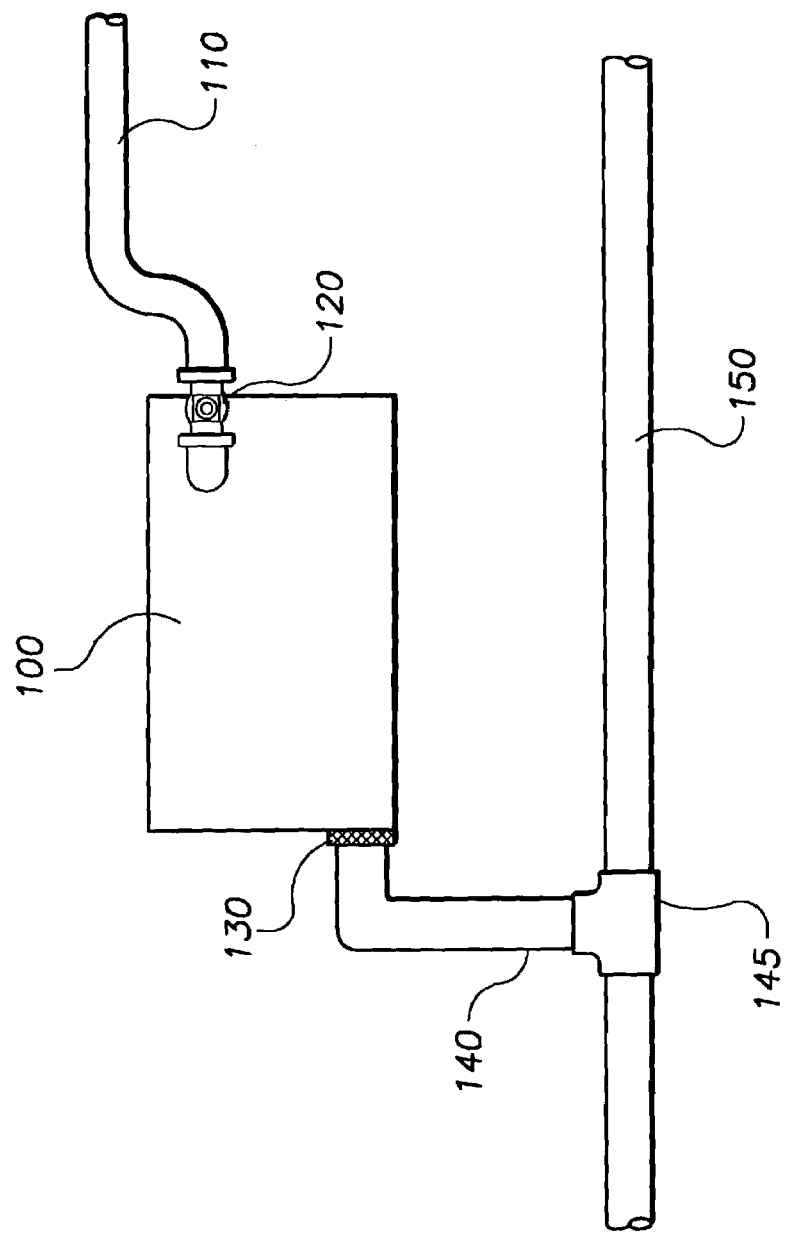
FIG. 3 is a schematic view showing a reservoir and wicking material network system.

Alternatively, the system can be installed with one or more porous "wicking" material networks and one or more reservoirs to achieve soil moisturization in place of the porous pipe 50. FIG. 3 is a schematic view of this system. The basis for the operation of this system is that if two materials of different make up, that are both porous, reach an equilibrium moisture content, then the need for water has been met. The system consists of a reservoir 100 of water that has a wicking material network 150 attached that runs parallel to the foundation. Water drains from the reservoir 100 and passes through the wicking material network 150 until the moisture content of the wicking material network is at an equilibrium moisture content with the soil. Once this has been achieved the reservoir 100 will stay at a constant level. A mesh screen 130 can potentially be installed between the reservoir 100 and the wicking material network 150 to prevent particles and debris from entering the wicking material network. The connection between the reservoir and the wicking material network can be made with a connection means 140, for example PVC pipe, and attached to the wicking material network 150 with an attachment means 145, for example collard compression fittings. If the water level in the reservoir 100 drops below a certain level, an auto fill valve 120 is opened to fill the reservoir back to the normal level.

The system can be connected by connector 110, in place of porous pipe 50, to polyethylene pipe 40 or it can be connected to existing hose bibs that access the internal water piping of a structure. Connector 110 can potentially be a flexible hose or rigid PVC pipe and include a pressure regulator, backflow prevention device and attachment means, for example means to attach to polyethylene pipe 40 or a hose bib on a house. The reservoir 100 should be placed near the center of the area to be watered and in an area that can be reached for maintenance. There can be one or more reservoirs for each zone. The wicking material network 150 should be placed at the base of the grade beam of a slab, no further than 24 inches away from the slab. Backfill around the wicking material network 150 should be of native soil only.

Figure 4:
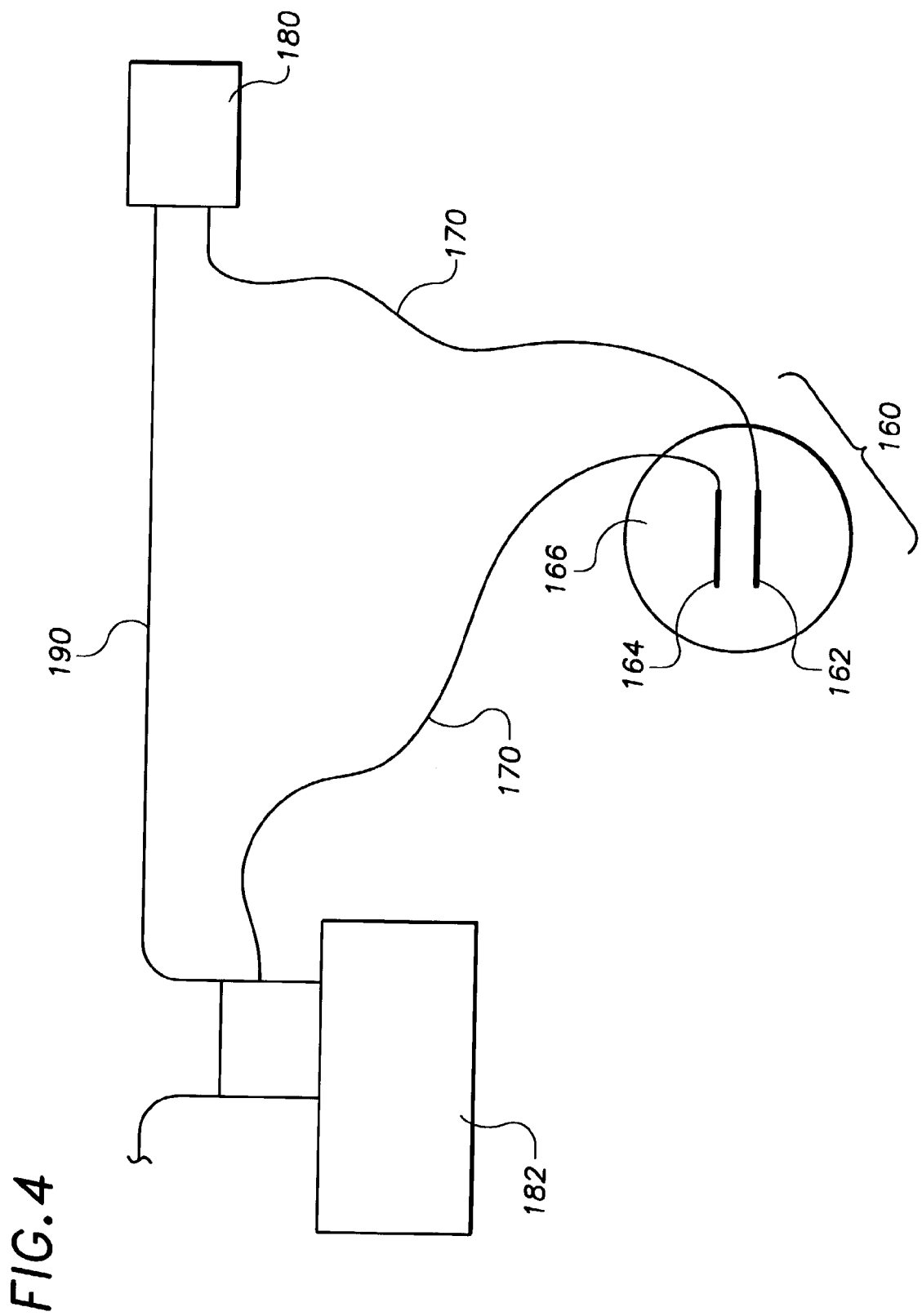
FIG. 4 is a schematic view showing a sensor.

In an alternative embodiment, a sensor can trigger a valve (by means of a controller) which opens and allows water to fill the reservoir back to a normal level. FIG. 4 is a schematic diagram of one possible sensor system. The sensor 160 is made from a wicking material that can be installed at various depths, for example if the area of concern is 10 inches then the bottom of the sensor is installed at the 10 inch depth. Once the moisture content of the soil is at an equilibrium with the sensor 160, the sensor expands thereby breaking the continuity of the electrical current passing through a zone valve wire and preventing the system from running. The sensor 160 has two non-corrosive pieces of metal as contacts 162 and 164 in the center of the wick 166. These contacts have lead wires that are attached to the live or hot wire 170 that runs between the valve 182 and the controller 180. The common wire 190 stays continuous from the controller 180 to the valve 182. Once the soil surrounding the wick reaches an equilibrium moisture content with the wick 166, the wick expands and breaks the continuity of the live wire by separating the contacts. When the soil ceases to have an equilibrium moisture content with the wick (i.e. the soil becomes drier), the wick contracts causing contacts 162 and 164 to connect, thereby completing the circuit and turning the system "on". The wick 166 can be incorporated into the wicking material network 150.

In another embodiment, it is possible to use this invention to transport and distribute other fluids such as pesticides or liquid fertilizers, for example in a garden or flower bed grown alongside a home or other structure. The system can be configured to distribute a desired amount of these fluids to soil and areas surrounding a foundation.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An irrigation system, comprising:
    a wicking material network positioned below ground in a soil region;
    a reservoir connected to the wicking material network and supplying fluid to the wicking material network based on a differential between a fluid content of the wicking material and a fluid content of the soil region; and
    a valve connected to said reservoir and adapted to deliver fluid to the reservoir from a fluid source when a fluid level within the reservoir drops below a specified level; and
    a sensor positioned in said soil region, wherein said sensor is connected to and actively controls said valve, wherein said sensor includes electrical contacts within the wicking material that are controlled by expansion and contraction of the wicking material.

2. A method of irrigation, comprising:
    installing a wicking material network below ground in a soil region;
    connecting a reservoir to said wicking material network;
    supplying fluid from said reservoir to said wicking material network based on a differential between a fluid content of the wicking material and a fluid content of the soil region;
    delivering fluid from a fluid source to said reservoir via a valve, wherein said valve delivers fluid to the reservoir when a fluid level within the reservoir drops below a specified level; and
    actively controlling said valve with a sensor positioned within said soil region, wherein said sensor includes electrical contacts within the wicking material that are controlled by expansion and contraction of the wicking material.

3. An irrigation system, comprising:
    a wicking material network positioned in a soil region; and
    a reservoir connected to the wicking material network and adapted to automatically supply fluid to the wicking material network, an amount of fluid supplied to the wicking material network being based on a differential between a fluid content of the wicking material and a fluid content of the soil region, wherein said wicking material network delivers fluid to said soil region according to said differential between the fluid content of the wicking material and the fluid content of the soil region, and wherein said wicking material network includes at least one hollow pipe made of wicking material.

4. The irrigation system of claim 1, wherein said fluid is selected from the group consisting of: water, pesticides, liquid fertilizers, and any combination thereof.

5. The irrigation system of claim 3, further comprising:
    a screen positioned between said reservoir and said wicking material network to prevent particles from entering the wicking material network.

6. The irrigation system of claim 3, further comprising:
    a connection means positioned between said reservoir and said wicking material network.

7. The system of claim 3, further comprising:
    a valve connected to said reservoir and adapted to deliver fluid to the reservoir from a fluid source when a fluid level within the reservoir drops below a specified level.

8. The irrigation system of claim 7, wherein said valve is a passive control valve.

9. The irrigation system of claim 8, wherein said passive control valve is a floating cut-off valve.

10. The irrigation system of claim 7, further comprising:
    a sensor positioned in said soil region, wherein said sensor is connected to and actively controls said valve.

11. The system of claim 3, wherein said reservoir is adapted to utilize gravity-feed to supply said fluid to said wicking material network.

12. A method for irrigation, comprising:
    installing a wicking material network in a soil region;
    connecting a reservoir to said wicking material network; and
    automatically supplying fluid from said reservoir to said wicking material network, an amount of fluid supplied to the wicking material network being based on a differential between a fluid content of the wicking material and a fluid content of the soil region, wherein said wicking material network delivers fluid to said soil region according to said differential between the fluid content of the wicking material and the fluid content of the soil region, and wherein said wicking material network includes at least one hollow pipe made of wicking material.

13. The method of claim 12, wherein said fluid is selected from the group consisting of: water, pesticides, liquid fertilizers, and any combination thereof.

14. The method of claim 12, further comprising:
    filtering flow of fluid between said reservoir and said wicking material network to prevent particles and debris from entering the wicking material network.

15. The method of claim 12, further comprising:
    delivering fluid from a fluid source to said reservoir via a valve, wherein said valve delivers fluid to the reservoir when a fluid level within the reservoir drops below a specified level.

16. The method of claim 15, wherein said valve is a passive control valve.

17. The method of claim 16, wherein said passive control valve is a floating cut-off valve.

18. The method of claim 15, further comprising:
    actively controlling said valve with a sensor positioned within said soil region.

19. The method of claim 12, wherein said reservoir utilizes gravity-feed to supply said fluid to said wicking material network.

* * * * *